INVENTORS
ARCH C. SCURLOCK,
KEITH E. RUMBEL AND
MILLARD LEE RICE
By Martha L. Ross
AGENT

INVENTORS
ARCH C. SCURLOCK,
KEITH E. RUMBEL AND
MILLARD LEE RICE

BY Martha L. Ross
AGENT

United States Patent Office 3,107,186
Patented Oct. 15, 1963

3,107,186
SOLID POLYVINYL CHLORIDE PROPELLANTS CONTAINING METAL
Arch C. Scurlock, Fairfax, Keith E. Rumbel, Falls Church, and Millard Lee Rice, Alexandria, Va., assignors to Atlantic Research Corporation, Alexandria, Va., a corporation of Virginia
Filed Aug. 6, 1953, Ser. No. 372,722
16 Claims. (Cl. 149—19)

This invention relates to new and improved propellant compositions.

The object of this invention is to provide propellants comprising polyvinyl chloride, an organic plasticizer and an oxidizing agent, which are characterized by increased specific impulse, increased burning rates and reduced pressure exponents.

Another object is to provide polyvinyl chloride propellants, the combustion products of which have reduced corrosion properties.

Still other objects and advantages of our invention will become obvious from the following description.

Figure 1:
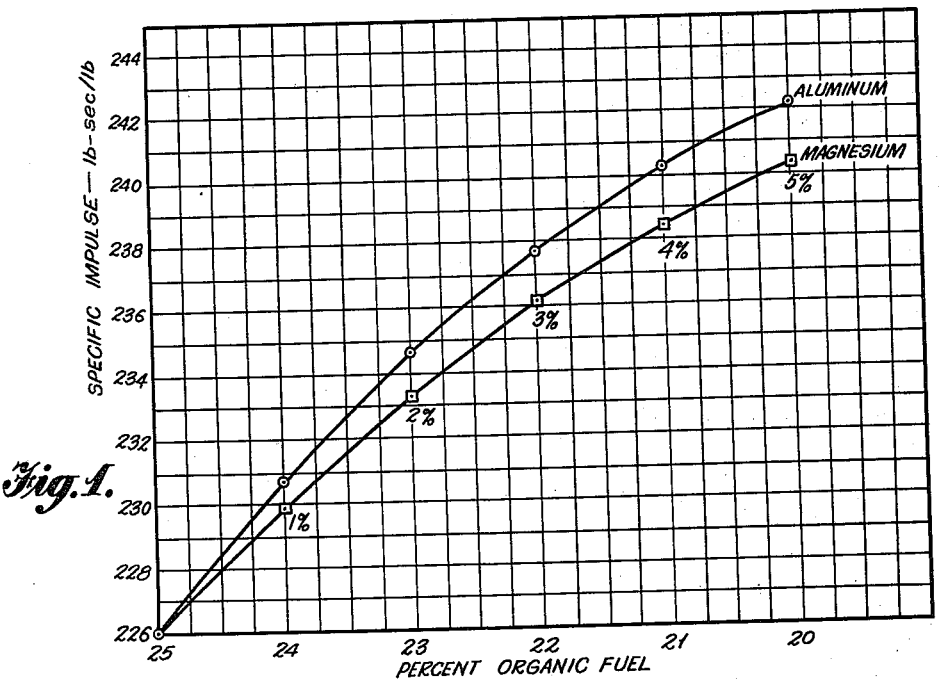
FIGS. 1 and 2 are graphs showing the increase in specific impulse obtained when aluminum and magnesium are incorporated into the polyvinyl chloride propellant compositions.

The polyvinyl chloride propellant compositions are solid, rubbery, non-brittle gels comprising a solution of polyvinyl chloride or a copolymer of polyvinyl chloride and polyvinyl acetate, of which the polyvinyl chloride comprises at least about 90%, in an organic plasticizer. Such propellants are disclosed in Weil application Serial Number 183,457, now Patent No. 2,966,403. A solid oxidizer, which is insoluble in the polyvinyl chloride-plasticizer mixture, is homogeneously dispersed throughout the gel. The terms "oxidizer" and "oxidizing agent" refer to compounds which actively and readily yield oxygen such as ammonium perchlorate, sodium perchlorate, potassium perchlorate, sodium nitrate, ammonium nitrate and the like. Organic oxidizers, such as hexanitroethane, mannitol hexanitrate and the like, may also be used if satisfactorily desensitized. For reasons of stability the inorganic oxidizers are preferable.

The polyvinyl chloride and organic plasticizer serve as fuel and binder in the propellant composition. The plasticizer should be one which dissolves the polyvinyl chloride very slowly at room temperature and rapidly at elevated temperatures. Examples of plasticizers which are suitable for the purpose include sebacates such as dibutyl sebacate and dioctyl sebacate, phthalates such as dioctyl phthalate, dibutyl phthalate and di-(methoxyethyl)-phthalate, adipates such as dioctyl adipate and di-(3,5,5-trimethylhexyl)-adipate, glycol esters of higher fatty acids, and the like.

Such propellants may be prepared by admixing finely divided polyvinyl chloride with the plasticizer to form a fluid slurry, dispersing the finely divided oxidizer in the slurry, pouring the mixture into molds and casting by heating the mixture to the temperature at which the polyvinyl chloride dissolves in the plasticizer. To permit pouring of the mix, it is desirable to employ sufficient plasticizer to retain fluidity of the slurry after incorporation of the solid polyvinyl chloride and oxidizer components. Upon cooling, the mixture sets into a solid, rubbery gel having excellent characteristics for use as propellants. In general, to obtain the desired physical characteristics in the propellant grains, the polyvinyl chloride is desirably present in a minimum ratio of about two parts of the resin to about three parts of the plasticizer and, preferably, in a ratio of about 1:1.

The amount of oxidizer added, for many purposes, is desirably sufficient substantially completely to oxidize the polyvinyl chloride and plasticizer fuel, namely about 75%. By complete oxidation is meant oxidation of substantially all of the carbon and hydrogen in the fuel, as for example, to CO and $H_2O$. However, for some uses such complete oxidation by the incorporated oxidizer is not necessary and the proportion of oxidizer may be reduced, though preferably, the oxidizer is in major proportion in the composition.

The specific impulse, burning rate and pressure exponent properties of such propellants are quite good. However, for many applications, higher specific impulse and higher burning rates are desirable. A reduced pressure exponent is also frequently advantageous, as for example, in rocket propulsion. The pressure exponent is, in effect, the slope of the curve of burning rate versus absolute pressure on logarithmic coordinates. Its relation to burning rate and pressure is defined in the following equation:

$$\text{Burning rate} = \text{constant} \times \text{pressure}^n$$

where $n$ is the pressure exponent. In any propellant composition having a positive pressure exponent, the burning rate increases with increasing pressure. Where the pressure exponent $n$ is high the pressure increase for a given increase in burning rate is greater than that which occurs when the pressure exponent is low.

One advantage of a low pressure exponent stems from the fact that, in general, burning rates of propellants increase as the initial temperature of the unburned propellant increases. Thus, if the pressure exponent is low, there is considerably less effect of the initial temperature of the unburned propellant on the equilibrium pressure in the combustion chamber when the propellant is burned in a chamber from which the combustion products exhaust through a nozzle, as in rocket propulsion. Another advantage of a low pressure exponent is the lesser extent of pressure rise in a rocket combustion chamber should the amount of burning surface be suddenly increased as by exposure of an internal crack or void in an imperfect propellant grain. This reduces the possibility of the pressure building up beyond that which the walls of the combustion chamber can safely withstand.

We have discovered that the inclusion of a minor proportion of finely divided magnesium or aluminum metal in the polyvinyl chloride propellant composition is highly advantageous in as much as it causes marked increases in specific impulse and burning rate and reduces the pressure exponent. Furthermore, where magnesium is used, it substantially reduces the amount of hydrogen chloride produced as a combustion product in the oxidation of the polyvinyl chloride. It also reduces the amount of HCl which is normally produced as a decomposition product when ammonium perchlorate is used as the oxidizing agent. In some applications the HCl is undesirable because of its corrosive effect on the walls of the combustion chamber. The magnesium combines with the chlorine to form $MgCl_2$ which is relatively stable at the high temperatures of the combustion reaction. Aluminum is not as effective for this purpose since it tends to form aluminum oxide rather than aluminum chloride.

The metal is incorporated by adding it to the propellant mix in the slurry or fluid stage prior to gelation. The order of addition is of no appreciable importance. For example, it may be added with the polyvinyl chloride, with the oxidizer, prior to or subsequent to the addition of the oxidizer.

The metal should not be incorporated into the propellant slurry in an amount greater than that which destroys fluidity of the mix. The desired fluidity is determined primarily by the amount of plasticizer present and to some extent by the specific character of the plasticizer and the particle size of the solid components. Some plasticizers can carry larger solid loads than others while still retaining fluidity. The larger the particle size of the solid components, as for example, the oxidizer, the polyvinyl chloride and the metal, the larger the amount of solids the plasticizer can carry. In general, the minimum amount of plasticizer required to maintain the desired fluidity is in the neighborhood of about 9 to 10%. It will be understood, of course, that in specific cases, the actual amount will be determined by the aforementioned variables.

Since a minimum proportion of plasticizer must be maintained, namely in the neighborhood of about 9 to 10%, and the polyvinyl chloride resin must be retained in suitable proportion to the plasticizer, namely in a minimum ratio of about 2 to 3 and, preferably, about 1 to 1, in order to obtain a propellant grain having the desired physical properties, the amount of metal which can be incorporated is largely determined by the amount of oxidizer. Where it is desired to provide a propellant having a substantially stoichiometric oxygen balance, as for example, by maintaining the oxidizer proportion at about 75% with a 1 to 1 ratio of polyvinyl chloride and plasticizer, the amount of metal which can be incorporated is generally in the neighborhood of about 5 to 7%. In FIG. 1, the propellant employed to obtain the data as shown in the graph comprised polyvinyl chloride and dibutyl sebacate in a ratio of 1 to 1 and 75% ammonium perchlorate. It will be seen that the incorporation of an amount of aluminum or magnesium as small as 5% increases the specific impulse by 7.2 and 6.3% respectively.

Figure 2:
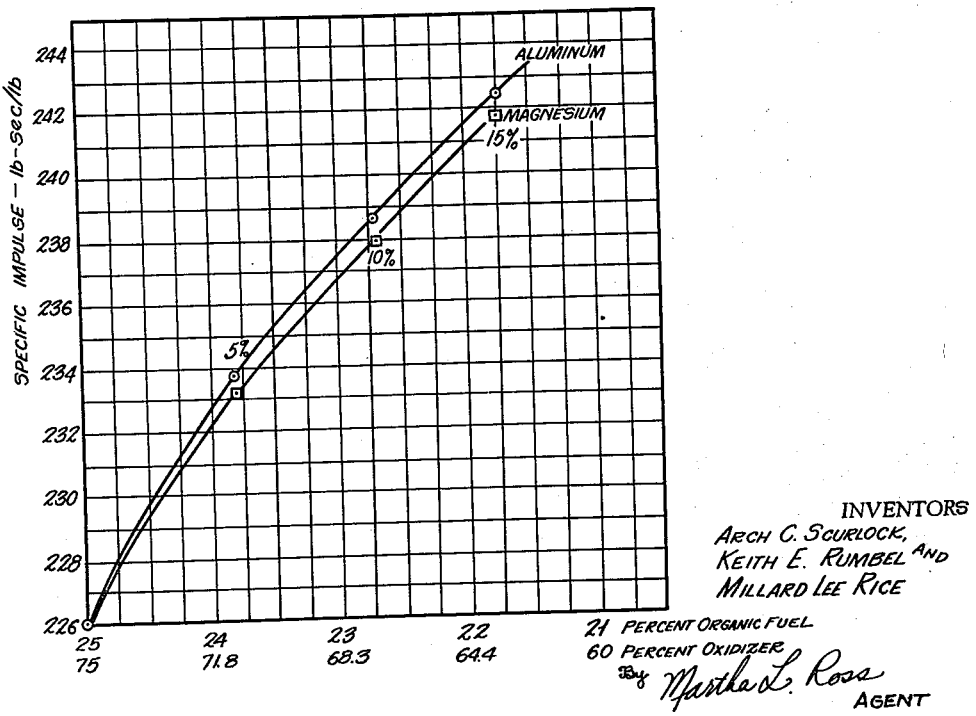

Considerably more of the metal may be incorporated into the propellant mix without destroying fluidity by concomitantly reducing the proportion of oxidizer. However, the oxidizer should be retained in major proportion and preferably at a minimum of about 55 to 60%. It is thus possible to introduce up to about 20 to 25% of metal, with about 15 to 20% as the optimum maximum. The effect on specific impulse of a propellant comprising polyvinyl chloride and dibutyl sebacate in a ratio of 1 to 1 with ammonium perchlorate as the oxidizer, resulting from the addition of aluminum and magnesium with concomitant reduction in oxidizer proportion is shown in the graph of FIG. 2. The addition of 15% of aluminum and magnesium gives increases in specific impulse of 7.3 and 7.0% respectively. Somewhat larger increases in specific impulse may be obtained by increasing the proportion of metal to about 20 to 25%.

Normally it is preferable to maintain the amount of oxidizer as closely as possible in stoichiometric oxygen balance since this ensures oxidation of substantially all of the organic fuel as well as the metal and, therefore, economic utilization of the propellant. When the proportion of oxidizer is reduced to permit incorporation of larger amounts of metal, the oxygen balance moves away from stoichiometric in a negative direction and results in incomplete combustion of fuel where there is no access of air into the combustion chamber. However, this disadvantage is offset in some cases by the somewhat greater increase in specific impulse which can be obtained in this manner. So long as the oxidizer is maintained in major proportion, the propellant composition is very effective.

It will be understood, of course, that the amount of metal incorporated in a specific propellant composition will be determined by the particular properties desired in terms of such factors as specific impulse, burning rate and pressure exponent.

The effect of the metals on burning rate is very marked, with increases as high as 35% or more resulting from the incorporation of as little as 5%. Effect on burning rate is shown in the graphs of FIGS. 3 and 4 and in Table I.

Figure 3:
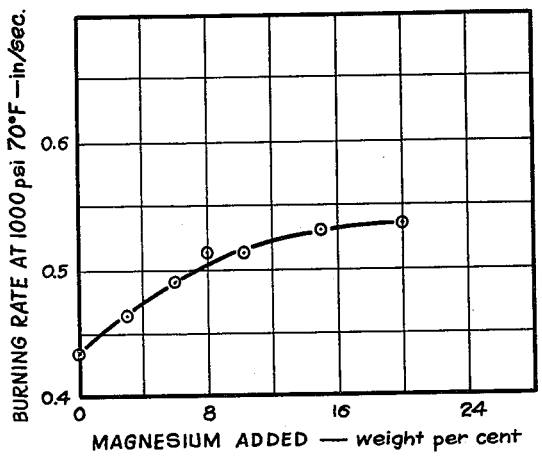
FIG. 3 shows the effect on burning rate when magnesium is added.

FIG. 3 shows the increase in burning rate at a pressure of 1000 p.s.i. at 70° F. obtained when magnesium is added to a propellant composition comprising 25% of equal parts of polyvinyl chloride and dibutyl sebacate and 75% ammonium perchlorate.

Figure 4:
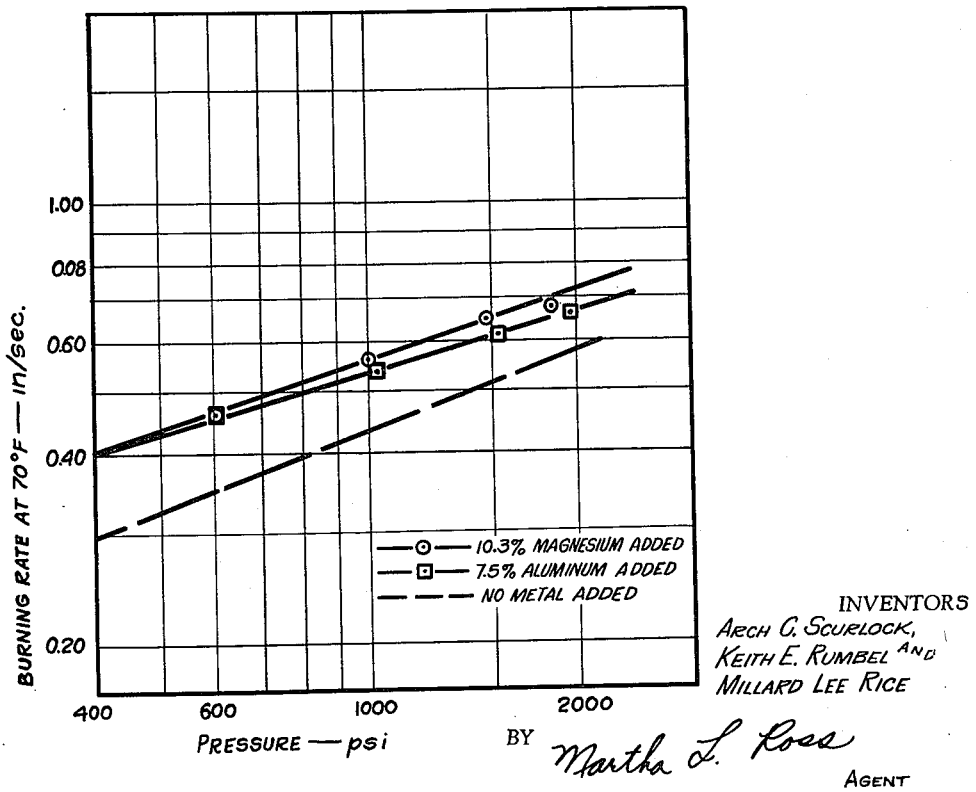
FIG. 4 is a graph comparing the burning rate at different pressures for polyvinyl chloride propellant compositions with and without added metal.

FIG. 4 illustrates on logarithmic coordinates the increase in burning rate obtained at different pressures when 10.3% magnesium or 7.5% aluminum is added to a basic propellant composition comprising 25% of equal parts of polyvinyl chloride and dibutyl sebacate and 75% ammonium perchlorate. The metal percentages represent stoichiometric equivalents of the chlorine contained in the propellant. The particle size distribution of the metals was similar with all of the particles being smaller than 325 microns. It will be noted that the slope of the magnesium and aluminum lines is considerably less than that of the basic mix, showing marked reduction in pressure exponent when the metals are added to the propellant composition.

Table I gives burning rate and pressure exponent data when magnesium and aluminum are incorporated into a propellant mix comprising polyvinyl chloride, dibutyl sebacate and ammonium perchlorate. The considerable increase in burning rate is accompanied by a marked reduction in pressure exponent.

*Table I*

| Composition (percent) | | | | | Ballistic data at 1,000 p.s.i.a. | |
|---|---|---|---|---|---|---|
| Ammonium perchlorate | Polyvinyl chloride | Dibutyl sebacate | Magnesium | Aluminum | Burning rate, in./sec. | Pressure exponent |
| 75.0 | 12.5 | 12.5 | ----- | ----- | 0.45 | 0.43 |
| 75.0 | 11.25 | 11.25 | 2.5 | ----- | 0.555 | 0.36 |
| 75.0 | 10.0 | 10.0 | 5.0 | ----- | 0.615 | 0.36 |
| 75.0 | 11.25 | 11.25 | ----- | 2.5 | 0.500 | 0.36 |
| 75.0 | 10.0 | 10.0 | ----- | 5.0 | 0.535 | 0.37 |
| 67.0 | 11.3 | 11.3 | 10.3 | ----- | 0.56 | 0.36 |
| 69.2 | 11.6 | 11.6 | ----- | 7.5 | 0.54 | 0.32 |

As aforementioned, magnesium reduces the corrosiveness of the combustion products by combining with the chlorine present and reducing the amount of HCl which would normally be produced. This is shown in Table II, which gives the relative amounts of HCl and MgCl$_2$ formed when varying amounts of magnesium metal are introduced into the propellant.

*Table II*

| Composition (percent) | | | | Combustion products, mol/percent | |
|---|---|---|---|---|---|
| Ammonium perchlorate | Polyvinyl chloride | Dibutyl sebacate | Magnesium | HCl | MgCl$_2$ |
| 75.0 | 12.5 | 12.5 | ----- | 20.4 | ----- |
| 75.0 | 10.0 | 10.0 | 5.0 | 16.5 | 1.9 |
| 71.2 | 11.9 | 11.9 | 5.0 | 16.4 | 1.7 |
| 67.3 | 11.35 | 11.35 | 10.0 | 14.4 | 2.1 |
| 64.15 | 10.85 | 10.85 | 15.0 | 13.1 | 2.3 |

The magnesium and aluminum are similarly effective in increasing specific impulse and burning rate and reducing pressure exponent when the polyvinyl chloride is combined with the various other plasticizers and oxidizers aforedescribed.

We have disclosed a number of examples and embodiments which are illustrative of our invention. However, it will be obvious to those skilled in the art that our invention encompasses a considerable number of variations within the scope of the claims.

We claim:
1. A propellant composition essentially comprising a major proportion of solid inorganic oxidizing salt, which is characterized by its ability to yield oxygen actively and readily, and a minor proportion of a finely divided metal selected from the group consisting of aluminum and magnesium, dispersed in a solid, rubbery gel in which the oxidizer is insoluble, said gel comprising polyvinyl chloride and an organic plasticizer, the resin being present in a minimum ratio of about two parts of resin to three parts of plasticizer, said plasticizer being characterized by its ability to dissolve the resin at a slow rate at ordinary temperatures and rapidly at elevated temperatures.

2. A propellant composition essentially comprising a major proportion of solid inorganic oxidizing salt, which is characterized by its ability to yield oxygen actively and readily, and a minor proportion of a finely divided metal selected from the group consisting of aluminum and magnesium, dispersed in a solid, rubbery gel in which the oxidizer is insoluble, said gel comprising polyvinyl chloride and an organic plasticizer, the resin and the plasticizer being present in proportions of approximately 1 to 1 and the plasticizer comprising a minimum of about 9 to 10% of the propellant composition, said plasticizer being characterized by its ability to dissolve the resin at a slow rate at ordinary temperatures and rapidly at elevated temperatures.

3. A propellant composition essentially comprising a major proportion of solid inorganic oxidizing salt, which is characterized by its ability to yield oxygen actively and readily, and a minor proportion of a finely divided metal selected from the group consisting of aluminum and magnesium, dispersed in a solid, rubbery gel in which the oxidizer is insoluble, said gel comprising polyvinyl chloride and an organic plasticizer, the resin and the plasticizer being present in proportions of approximately 1 to 1 and the plasticizer comprising a minimum of about 9 to 10% of the propellant composition, the oxidizer being present in an amount sufficient to oxidize substantially all of the oxidizable fuel components, said plasticizer being characterized by its ability to dissolve the resin at a slow rate at ordinary temperatures and rapidly at elevated temperatures.

4. The composition of claim 3 wherein the metal is aluminum.

5. The composition of claim 3 wherein the metal is magnesium.

6. A propellant composition essentially comprising a major proportion of ammonium perchlorate and a minor proportion of a finely divided metal selected from the group consisting of aluminum and magnesium, dispersed in a solid, rubbery gel comprising polyvinyl chloride and an organic plasticizer, the resin and the plasticizer being an present in proportions of approximately 1 to 1, the plasticizer comprising a minimum of about 9 to 10% of the propellant composition, said plasticizer being characterized by its ability to dissolve the resin at a slow rate at ordinary temperatures and rapidly at elevated temperatures.

7. A propellant composition essentially comprising a major proportion of solid inorganic oxidizing salt, which is characterized by its ability to yield oxygen actively and readily, and a minor proportion of finely divided metal selected from the group consisting of aluminum and magnesium and comprising a maximum of about 20 to 25% by weight of said composition, dispersed in a solid rubbery gel in which the oxidizer is insoluble, said gel comprising polyvinyl chloride and an organic plasticizer, said plasticizer being characterized by its ability to dissolve the resin at a slow rate at ordinary temperatures and rapidly at elevated temperatures.

8. A propellant composition comprising about 75% solid inorganic oxidizing salt, which is characterized by its ability to yield oxygen actively and readily, and a minor proportion of finely divided metal selected from the group consisting of aluminum and magnesium and comprising a maximum of about 5 to 7% of said composition by weight, dispersed in a solid rubbery gel in which the oxidizer is insoluble, said gel comprising polyvinyl chloride and an organic plasticizer, said plasticizer being characterized by its ability to dissolve the resin at a slow rate at ordinary temperatures and rapidly at elevated temperatures.

9. A propellant composition comprising about 75% ammonium perchlorate and a minor proportion of finely divided metal selected from the group consisting of aluminum and magnesium and comprising a maximum of about 5 to 7% by weight of said composition, dispersed in a solid rubbery gel comprising polyvinyl chloride and dibutyl sebacate, said dibutyl sebacate comprising at least about 9 to 10% of the composition.

10. The composition of claim 7 wherein the metal is aluminum.

11. The composition of claim 7 wherein the metal is magnesium.

12. The composition of claim 1 wherein the metal is aluminum.

13. The composition of claim 1 wherein the metal is magnesium.

14. A propellant composition essentially comprising a major proportion of solid strong oxidizing agent selected from the group consisting of inorganic oxidizing salt, hexanitroethane and mannitol hexanitrate and a minor proportion of a finely divided metal selected from the group consisting of aluminum and magnesium, dispersed in a solid gel in which the oxidizer is insoluble, said gel serving as fuel and comprising polyvinyl chloride and an organic plasticizer which dissolves the polyvinyl chloride slowly at ordinary temperatures and rapidly at elevated temperatures.

15. The composition of claim 14 wherein the metal is aluminum.

16. The composition of claim 15 wherein the metal is magnesium.

References Cited in the file of this patent

UNITED STATES PATENTS

| 1,929,453 | Semon | Oct. 10, 1933 |
| 2,067,213 | Snelling | Jan. 12, 1937 |
| 2,643,184 | Cairns | June 23, 1953 |
| 2,673,193 | Kolvoort | Mar. 23, 1954 |

FOREIGN PATENTS

| 655,585 | Great Britain | July 25, 1951 |

OTHER REFERENCES

Journal of the American Rocket Society, No. 72, December 1947, p. 14.